United States Patent Office 3,012,076
Patented Dec. 5, 1961

3,012,076
PHOSPHINOBORINE COMPOUNDS AND THEIR PREPARATION
Anton B. Burg, Los Angeles, and Ross I. Wagner, Whittier, Calif., assignors to The University of Southern California, a corporation of California
No Drawing. Filed Nov. 2, 1959, Ser. No. 850,062
17 Claims. (Cl. 260—606.5)

This application is a continuation-in-part of copending applications Serial Nos. 666,213, filed June 17, 1957, now Patent 2,925,440, and 678,429, filed August 15, 1957, now abandoned and both in turn, are continuations-in-part of application Serial No. 446,147, filed July 27, 1954, now abandoned.

This invention relates in general to phosphinoborine polymers and their production and, more particularly, to phosphinoborines which are linear polymeric materials, adjacent phosphorus and boron atoms of the phosphinoborine monomers being joined one to the next to form extended chains.

It is an object of this invention to provide phosphinoborines which are linear polymers and which, as set forth in the aforementioned copending applications and in the aforementioned abandoned application and also as set forth in a divisional application of the said abandoned application (the divisional application being identified as Serial No. 754,914, filed August 14, 1958, and now abandoned) are suitable for use as dielectrics, especially where high temperature resistance is desired.

A further object of this invention is to provide a method for synthesizing phosphinoborine polymers.

Further objects and advantages, if not specifically set out, will become apparent during the course of the detailed description which follows.

Broadly, it has been found that compounds of the aforementioned type, having the general formula $[HRPBR'R'']_n$, 

may be prepared by several methods from certain phosphine borines. In the formula, R, R' and R'' represent hydrogen, aliphatic radicals, alicyclic radicals or aromatic radicals, substituted and unsubstituted, and $n$ is an integer indicative of the degree of polymerization and may be as low as 3 or 4 or much larger. Preferably, R represents alkyl groups having less than 13 carbon atoms, lower cycloalkyl, phenyl, lower alkyl-substituted phenyl, biphenyl or naphthyl and R' and R'' represent hydrogen, lower alkyl or phenyl.

These phosphinoborines may be prepared by the dehydrohalogenation of the corresponding phosphine haloborines to yield the desired phosphinoborines.

More particularly, in the dehydrohalogenation of phosphine haloborines, the reaction proceeds:

$n'(RH_2P:BR'R''X) \longrightarrow \frac{n'}{n}(RHPBR'R'')_n + n'HX$ 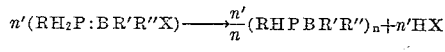

wherein X is a halogen and each of the other symbols are used in the fashion set out earlier. Thus, the byproduct HX is a hydrohalogen acid. This is prevented from replacing the weaker boron acid function from the reactant phosphine borine to form a phosphonium salt by providing a quantity of tertiary amine in the reaction vessel. This reacts with the hydrohalogen acid and so removes it from the reaction mixture as a substituted ammonium salt. As this reaction may be carried out at room temperature, a wide variety of solvents, such as any of the ethers, may be employed. For example, diethyl ether is readily available and is recommended for use in the process. Another solvent which is suitable is benzene.

It is necessary that a halogen from the group chlorine, bromine and iodine, and excluding fluorine, be bonded to the boron atom since essential to the dehydrohalogenation method is the removal of the hydrohalogen acid which forms by means of a tertiary amine. Where fluorine is bonded to the boron, the HF acid which forms behaves entirely unlike the other hydrohalogen acids, not being a strong acid in solution. Thus, it does not combine with the weak base to form an insoluble ternary ammonium salt. Therefore, the HF acid cannot be extracted from the P:B complex, thus making impossible the formation of the desired phosphinoborine. Stronger bases than the amines cannot be used since such materials as alkalis tend to displace the weaker phosphine base from the phosphine borine addition compound.

The practice of this invention, both in respect to performing the processes and securing the products thereof, will become apparent from the following examples which are set forth by way of illustration.

EXAMPLE I

Methylphosphine dimethylbromoborine,
$CH_3H_2P:BBr(CH_3)_2$,
was prepared in an ether medium from 1.24 g. of methylphosphine and dimethylbromoborine, 3.10 g. of this material being used in 200 ml. diethyl ether solvent. Thereafter, 2.60 g. triethylamine was added to the reaction flask. Triethylammonium bromide was filtered from the reaction mixture. After removal of the solvent by distillation at reduced pressure, a yield of 89–93% of the theoretical of the monomethylphosphinodimethylborine polymer $[HCH_3PB(CH_3)_2]_n$ was obtained. Similar reactions were run using dimethylaniline to remove the hydrobromic acid.

EXAMPLE II

Phosphine dimethylbromoborine, $H_3P:BBr(CH_3)_2$, was prepared in a diethyl ether medium from 0.513 g. of dimethylbromoborine into which had been passed 0.150 g. of phosphine. Thereafter, 0.430 g. triethylamine were added to the reaction flask. Triethylammonium bromide was filtered from the reaction mixture and the solvent removed by distillation so as to produce a high yield of the phosphinodimethylborine polymer. The product contained a considerable quantity of the monomer when first produced and on standing polymerized to produce the oily linear polymer with an average degree of polymerization of 28 having the general formula $[H_2PB(CH_3)_2]_n$ 

This product is obtained either as a sticky solid which spontaneously inflames or as a liquid such as that described in this example, which oxidizes rapidly in air. The monomer and lower polymers, when freshly formed, undergo rapid methanolysis at 25–65° C. while the higher polymers are attacked slowly.

EXAMPLE III

Phosphine di-n-butylbromoborine, $H_3P:BBr(n-C_4H_9)_2$, was prepared in situ by placing 20.5 of di-n-butylbromoborine in a 500 ml. round bottom flask which had been flushed with nitrogen. Diethyl ether in a quantity of 300 ml. was added to the flask and 3.4 g. of phosphine run in. Triethylamine in the amount of 10 g. was added to the flask and triethylammonium bromide was filtered from the reaction mixture. The solvent was removed by distillation at reducedf pressure to supply a 95–97% yield of a mixture of monomers and lower polymers which on standing polymerized to the phosphino-di-n-butylborine polymer, $[H_2PB(n-C_4H_9)_2]_n$. As in Example II, the product was an oily colorless liquid. On standing, higher polymers were obtained.

EXAMPLE IV

A 353.3 cc. quantity of $(CH_3)_2BBr$ was condensed into a reaction tube together with 354.0 cc. $CH_3PH_2$, 1.5974 g. (353.5 cc.) $(C_2H_5)_3N$ and 25 ml. $(C_2H_5)_2O$. The reaction tube, which was connected to a heavy-walled Pyrex tube of 80 ml capacity through a fritted glass filter, was sealed and allowed to stand overnight at 25° C. The precipitated triethylammonium bromide was filtered out and washed five times by distilling the solvent back into the precipitate. The section of the apparatus containing $(C_2H_5)_3NHBr$ and solvent was sealed off and separated from the tube containing the viscous $[H(CH_3)PB(CH_3)_2]_n$.

EXAMPLE V

Cyclohexylphosphine bromoborine, $$C_6H_{11}(H)_2P:BBrH_2$$

in the amount of 2.21 g. was placed in a 250 ml. round bottom flask which had been flushed with nitrogen. Diethyl ether in the amuont of 75 ml. was added to the flask and thereafter dimethylaniline in the amount of 1.33 g. was added. The contents were slightly warmed and the reaction was allowed to proceed for 6 hours. Phenyldimethylammonium bromide was filtered from the reaction mixture and the solvent distilled off at a low pressure to leave a fair yield of the initially monomeric cyclohexylphosphinoborine, $C_6H_{11}(H)PBH_2$. On standing, the product polymerized and became progressively more viscous. Initially, it was in the form of an oily liquid.

The stoichiometry for further runs which may be made in accordance with Examples I–V above is set forth in the table below.

446,148, filed July 27, 1954, entitled "Phosphine Borine Compounds and Their Preparation," now abandoned, in copending application Serial No. 678,430, filed August 15, 1957, and now abandoned entitled "Phosphine Borine Compounds and Their Preparation," and in copending application Serial No. 850,063, filed even date herewith, entitled "Phosphine Borine Compounds and Their Preparation."

Obviously, many modifications and variations of the invention as hereinbefore set forth may be made without departing from the spirit and scope thereof, and therefore only such limitations should be imposed as are indicated in the appended claims.

We claim:

1. A linear phosphinoborine polymer having the formula $[HRPBR'R'']_n$ wherein R is selected from the class consisting of hydrogen, alkyl groups of less than 13 carbon atoms, lower cycloalkyl, phenyl, lower alkyl-substituted phenyl, biphenyl and naphthyl, wherein R' and R'' are selected from the class consisting of hydrogen, lower alkyl and phenyl, at least one of the groups R, R' and R'' representing any of the above constituents other than hydrogen and wherein n is an interger indicative of the degree of polymerization.

2. A linear phosphinoborine polymer having the formula $[HCH_3PBR'R'']_n$ wherein R' and R'' are selected from the class consisting of hydrogen, lower alkyl and phenyl and wherein n is an integer indicative of the degree of polymerization.

3. A linear phosphinoborine polymer having the formula $[HC_2H_5PBR'R'']_n$ wherein R' and R'' are selected from the class consisting of hydrogen, lower alkyl and phenyl and wherein n is an integer indicative of the degree of polymerization.

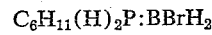

*Table A*

| Example No. | Phosphine Haloborine | Grams | Tertiary Amine | Grams | Solvent | Product |
|---|---|---|---|---|---|---|
| VI | $n\text{-}C_4H_9PH_2:BHBrCH_3$ | 1.94 | dimethylaniline | 1.21 | diethyl ether | $[n\text{-}C_4H_9HPBHCH_3]_n$ |
| VII | $C_2H_5PH_2:BBrHCH_3$ | 16.80 | do | 12.10 | benzene | $[C_2H_5HPBHCH_3]_n$ |
| VIII | $n\text{-}C_4H_9PH_2:(CH_3)_2Br$ | 7.00 | triethylamine | 3.50 | diethyl ether | $[n\text{-}C_4H_9HPB(CH_3)_2]_n$ |
| IX | $C_5H_{11}PH_2:BH_2Br$ | 31.50 | do | 19.70 | benzene | $[C_5H_{11}HPBH_2]_n$ |
| X | $C_3H_7PH_2:B(CH_3)_2Br$ | 20.10 | dimethylaniline | 12.20 | diethyl ether | $[C_3H_7HPB(CH_3)_2]_n$ |
| XI | $H_3P:BH_2Br$ | 1.67 | triethylamine | 1.32 | do | $[H_2PBH_2]_n$ |
| XII | $CH_3PH_2:BHC_5H_{11}Br$ | 1.48 | do | 0.71 | do | $[HCH_3PBHC_5H_{11}]_n$ |
| XIII | $CH_3PH_2:BHC_3H_7Br$ | 18.10 | do | 10.10 | benzene | $[HCH_3PBHC_3H_7]_n$ |
| XIV | $H_3P:BBr(C_8H_{17})_2$ | 70.20 | do | 20.20 | do | $[H_2PB(C_8H_{17})_2]_n$ |
| XV | $H_2P:BBr(C_{12}H_{25})_2$ | 14.80 | do | 5.10 | do | $[H_2PB(C_{12}H_{25})_2]_n$ |
| XVI | $C_2H_5PH_2:BC_4H_9HBr$ | 2.10 | dimethylaniline | 1.21 | diethyl ether | $[HC_2H_5PBH(C_4H_9)]_n$ |
| XVII | $C_{12}H_{25}PH_2:BH_2Br$ | 14.79 | triethylamine | 5.56 | benzene | $[C_{12}H_{25}HPBH_2]_n$ |
| XVIII | $CH_3PH_2:BHC_4H_9Br$ | 3.84 | do | 2.02 | do | $[CH_3HPBHC_4H_9]_n$ |
| XIX | $\{CH_3PH_2:BH_2Br$ / $C_2H_5PH_2:BH_2Br\}$ | 13.80 / 15.40 | do | 20.20 | diethyl ether | $[CH_3HPBH_2]_n[C_2H_5HPBH_2]_n$ |
| XX | $CH_3PH_2:BH_2Br$ | 1.83 | do | 1.32 | do | $[HCH_3PBH_2]_n$ |
| XXI | $C_2H_5PH_2:B(CH_3)_2Br$ | 2.01 | do | 1.11 | do | $[HC_2H_5PB(CH_3)_2]_n$ |
| XXII | $\{CH_3PH_2:B(CH_3)_2Br$ / $C_2H_5PH_2:B(CH_3)_2Br\}$ | 6.88 / 7.45 | do | 8.20 | do | $[HCH_3PB(CH_3)_2]_n[C_2H_5HPB(CH_3)_2]_n$ |
| XXIII | $CH_3PH_2:BCl(C_2H_5)_2$ | 4.50 | do | 3.44 | do | $[HCH_3PB(C_2H_5)_2]_n$ |
| XXIV | $C_2H_5PH_2:BI(CH_3)_2$ | 5.59 | do | 2.46 | do | $[C_2H_5HPB(CH_3)_2]_n$ |
| XXV | $C_6H_{11}H_2P:B(CH_3)_2Br$ | 1.65 | do | 0.71 | do | $[C_6H_{11}HPB(CH_3)_2]_n$ |
| XXVI | $C_6H_5H_2P:BH_2Br$ | 2.03 | do | 1.01 | benzene | $[C_6H_5HPBH_2]_n$ |
| XXVII | $C_6H_5H_2P:B(n\text{-}C_3H_7)_2Br$ | 0.26 | do | 0.13 | diethyl ether | $[C_6H_5HPB(n\text{-}C_3H_7)_2]_n$ |
| XXVIII | $(CH_3C_6H_4)H_2P:BH_2Br$ | 1.56 | do | 0.72 | do | $[(CH_3C_6H_4)HPBH_2]_n$ |
| XXIX | $(C_6H_5C_6H_4)H_2P:BH_2Br$ | 1.45 | do | 0.53 | do | $[(C_6H_5C_6H_4)HPBH_2]_n$ |
| XXX | $C_{10}H_7H_2P:BH_2Br$ | 1.54 | do | 0.62 | do | $[C_{10}H_7HPBH_2]_n$ |
| XXXI | $C_6H_5H_2P:B(CH_3)_2Br$ | 1.87 | do | 0.81 | do | $[C_6H_5HPB(CH_3)_2]_n$ |

The compounds of this invention find use as dielectrics. Compounds of the formula $[RHPBH_2]_n$ where R is not hydrogen are reasonably resistant to oxidation and may be exposed to air while in use, but compounds falling within the scope of this invention and having the formula $[H_2PBR'R'']_n$ should be protected against contact with oxygen and other oxidizing agents as they are somewhat more readily oxidized. Also, the oxidative stability increases when the compounds are used in a more massive state; when finely divided, their susceptibility to oxidation is increased. In any event, all of the compounds in this invention have excellent dielectric properties.

Phosphine borine materials are used in the examples set forth above in a number of instances. It is to be understood that they may be prepared in accordance with the procedure set out in our application Serial No.

4. A linear phosphinoborine polymer having the formula $[HRPBR'CH_3]_n$ wherein R is selected from the class consisting of hydrogen, alkyl groups of less than 13 carbon atoms, lower cycloalkyl, phenyl, lower alkyl-substituted phenyl, biphenyl and naphthyl, wherein R' is selected from the class consisting of hydrogen, lower alkyl and phenyl and wherein n is an integer indicative of the degree of polymerization.

5. A linear phosphinoborine polymer having the formula $[HRPBR'H]_n$ wherein R is selected from the class consisting of hydrogen, alkyl groups of less than 13 carbon atoms, lower cycloalkyl, phenyl, lower alkyl-substituted phenyl, biphenyl and naphthyl, wherein R' is selected from the class consisting of hydrogen, lower alkyl and phenyl, at least one of the groups R and R' representing any of the above constituents other than hydrogen and wherein $n$ is an integer indicative of the degree of polymerization.

6. A linear phosphinoborine polymer having the formula $[HRPB(CH_3)_2]_n$ wherein R is selected from the class consisting of alkyl groups of less than 13 carbon atoms, hydrogen, lower cycloalkyl, phenyl, lower alkyl-substituted phenyl, biphenyl and naphthyl and wherein $n$ is an integer indicative of the degree of polymerization.

7. A linear phosphinoborine polymer having the formula $[H(C_6H_5)PBR'R'']_n$ wherein R' and R'' are selected from the class consisting of hydrogen, lower alkyl and phenyl and wherein $n$ is an integer indicative of the degree of polymerization.

8. A linear phosphinoborine polymer having the formula $[HC_6H_{11}PBR'R'']_n$ wherein R' and R'' are selected from the class consisting of hydrogen, lower alkyl and phenyl and wherein $n$ is an integer indicative of the degree of polymerization.

9. A linear phosphinoborine polymer having the formula $[H(CH_3C_6H_4)PBR'R'']_n$ wherein R' and R'' are selected from the class consisting of hydrogen, lower alkyl and phenyl and wherein $n$ is an integer indicative of the degree of polymerization.

10. The linear polymer methylphosphinodimethylborine.
11. The linear polymer phosphinodimethylborine.
12. The linear polymer methylphosphinoborine.
13. The linear polymer ethylphosphinodimethylborine.
14. The linear copolymer methylphosphinodimethylborine-ethylphosphinodimethylborine.
15. The linear polymer cyclohexylphosphinoborine.
16. The linear polymer phenylphosphinoborine.
17. The linear polymer tolyphosphinoborine.

References Cited in the file of this patent

Gamble et al.: J. Am. Chem. Soc., vol. 62, pp. 717 to 721 (1940).